(12) United States Patent
Liu et al.

(10) Patent No.: US 12,149,571 B2
(45) Date of Patent: Nov. 19, 2024

(54) METHOD, APPARATUS, DEVICE AND MEDIUM FOR PROCESSING GROUP INFORMATION

(71) Applicant: Beijing Zitiao Network Technology Co., Ltd., Beijing (CN)

(72) Inventors: Shengyang Liu, Beijing (CN); Cheng Jiang, Beijing (CN); Xiao Jia, Beijing (CN); Junyi Yang, Beijing (CN); Penghui Wang, Beijing (CN); Runqiong Wang, Beijing (CN); Lingyu Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/655,007

(22) Filed: May 3, 2024

(65) Prior Publication Data

US 2024/0291875 A1 Aug. 29, 2024

Related U.S. Application Data

(63) Continuation of application No. PCT/CN2022/137999, filed on Dec. 9, 2022.

(30) Foreign Application Priority Data

Dec. 27, 2021 (CN) .......................... 202111620197.5

(51) Int. Cl.
*H04L 65/1093* (2022.01)
*H04L 12/18* (2006.01)

(52) U.S. Cl.
CPC ...... *H04L 65/1093* (2013.01); *H04L 12/1822* (2013.01); *H04L 12/1827* (2013.01)

(58) Field of Classification Search
None
See application file for complete search history.

(56) References Cited

U.S. PATENT DOCUMENTS

| 8,175,243 | B2 * | 5/2012 | Mahalingam | ........... | H04M 3/56 |
| | | | | | 379/202.01 |
| 8,849,955 | B2 * | 9/2014 | Prahlad | ............... | H04L 63/0428 |
| | | | | | 709/215 |

(Continued)

FOREIGN PATENT DOCUMENTS

| CN | 106549988 A | 3/2017 |
| CN | 111324259 A | 6/2020 |

(Continued)

OTHER PUBLICATIONS

International Search Report in PCT/CN2022/137999, mailed Feb. 7, 2023, 3 pages.

(Continued)

*Primary Examiner* — Raqiul A Choudhury
(74) *Attorney, Agent, or Firm* — Astute IP Law Group

(57) ABSTRACT

This application discloses a method for processing group information. When an upper limit of a number of people in a target group needs to be expanded, an expansion request is transmitted based on triggering by a first user on the target group. The expansion request includes an identification of the target group, and the expansion request is configured to request for expanding an upper limit of a number of group members of the target group. A second user with expansion permission may configure the upper limit of the number of the target group based on the expansion request. In response to a configuration by the second user on the target group, an expansion response is transmitted to a client of the first user, where the expansion response is configured to indicate a result of expansion on the target group.

16 Claims, 7 Drawing Sheets

(56) References Cited

U.S. PATENT DOCUMENTS

| | | | |
|---|---|---|---|
| 2004/0246332 A1* | 12/2004 | Crouch | H04L 65/4038 379/202.01 |
| 2009/0047564 A1 | 2/2009 | Touvard | |
| 2010/0136985 A1* | 6/2010 | Inoue | H04W 4/029 455/67.11 |
| 2013/0096989 A1* | 4/2013 | Dale | G06Q 30/02 705/7.34 |
| 2013/0108034 A1* | 5/2013 | Colbert | H04M 3/566 379/202.01 |
| 2013/0109365 A1* | 5/2013 | Buzdugan | H04W 76/40 455/416 |
| 2018/0337968 A1* | 11/2018 | Faulkner | H04L 51/046 |
| 2020/0296227 A1 | 9/2020 | Yamada | |

FOREIGN PATENT DOCUMENTS

| | | |
|---|---|---|
| CN | 113259139 A | 8/2021 |
| CN | 115022106 A | 9/2022 |

OTHER PUBLICATIONS

Office Action in Chinese Patent Application No. 20111620197.5, mailed Jun. 16, 2023, 11 pages.
Zhai Yarong, "Design and Implementation of Distributed Unified Communication Server Based on Container", University of Chinese Academy of Sciences, Jun. 2018, 86 pages, with English Abstract.
ZTE, China Unicom, Samsung, "Key issue 5 Requirements and technical issues for subscriber group.v2", SA WG2 Meeting #94, S2-124412, New Orleans, USA, Nov. 12-16, 2012, 10 pages.

* cited by examiner

FIG. 4a

METHOD, APPARATUS, DEVICE AND MEDIUM FOR PROCESSING GROUP INFORMATION

CROSS-REFERENCE TO RELATED APPLICATIONS

This application is a continuation of International Patent Application No. PCT/CN2022/137999, filed on Dec. 9, 2022, which claims priority to Chinese Patent Application No. 202111620197.5, filed on Dec. 27, 2021, entitled "METHOD, APPARATUS, DEVICE AND MEDIUM FOR PROCESSING GROUP INFORMATION", both of which are incorporated herein by reference in their entireties.

FIELD

This application relates to the field of computer technology, and specifically to a method, apparatus, device and medium for processing group information.

BACKGROUND

In order to improve work efficiency and the speed of message spread, various types of internet conversation groups are established in actual work to communicate through internet conversation groups.

However, as the size of the group becomes larger, it is easier to generate a large amount of invalid information, causing interference to users. Based on this, the group size needs to be effectively managed to improve the user experience.

SUMMARY

In view of this, the embodiments of the present application provide a method, apparatus, device and medium for processing group information, so that users can apply to expand the size of the group on demand by themselves, which improves the user experience.

In order to achieve the above objectives, the technical solutions provided by the embodiments of this application are as follows.

In a first aspect of the embodiments of the present application, a method for processing group information is provided, and the method includes:
  in response to triggering by a first user on a target group, transmitting an expansion request, the expansion request comprising an identification of the target group, and the expansion request being configured to request for expanding an upper limit of a number of group members of the target group; and
  receiving an expansion response, the expansion response being configured to indicate a result of expansion on the target group.

In a second aspect of the embodiments of the present application, an apparatus for processing group information is provided, and the apparatus includes:
  a transmitting unit configured to transmit an expansion request in response to triggering by a first user on a target group, the expansion request comprising an identification of the target group, and the expansion request being configured to request for expanding an upper limit of a number of group members of the target group; and
  a receiving unit configured to receive an expansion response, the expansion response being configured to indicate a result of expansion on the target group.

In a third aspect of the embodiments of the present application, an electronic device is provided, and the device includes: a processor and a memory;
  the memory is configured to store instructions or computer programs; and
  the processor is configured to execute the instructions or computer programs in the memory, so that the electronic device executes the method for processing group information described in the first aspect.

In a fourth aspect of the embodiments of the present application, a computer-readable storage medium is provided, the computer-readable storage medium stores instructions therein, and when running on a device, the instructions cause the device to execute the method for processing group information described in the first aspect.

In a fifth aspect of the embodiments of the present application, a computer program product is provided, when running on a computer, the computer program product causes the computer to execute the method for processing group information described in the first aspect.

It can be seen that the embodiments of the present application have the following beneficial effects:

In the embodiments of this application, when the upper limit of the number of people in the target group needs to be expanded, the first user can trigger a corresponding operation on the target group. Based on the triggering by the first user on the target group, an expansion request is transmitted. The expansion request includes an identification of the target group. The expansion request is configured to request for expanding an upper limit of a number of group members of the target group. For a second user with an expansion operation permission, the upper limit of the number of group members of the target group can be configured based on the expansion request. In response to a configuration by the second user on the target group, an expansion response is transmitted to the client of the first user, where the expansion response is configured to indicate a result of expansion on the target group. It can be seen that through the embodiments of the present application, when the upper limit of the number of people in the target group needs to be changed, the first user can apply for expansion autonomously to meet application needs, which improves the user experience. At the same time, the second user may configure the upper limit of the number of people in a single group through the management background, so that the capacity of a single group can be flexibly managed.

BRIEF DESCRIPTION OF THE DRAWINGS

In order to more clearly illustrate the technical solutions in the embodiments of the present application or the prior art, the drawings needed to describe the embodiments or the prior art will be briefly introduced below. Obviously, the drawings in the following description are only used for the purpose of describing the embodiments of the present application. For those skilled in the art, other drawings can also be obtained based on these drawings without creative labor.

FIG. 4a is a schematic diagram of a group size management page provided by an embodiment of the present application;

DETAILED DESCRIPTION

In order to make those skilled in the art to better understand the solutions of the present application, the technical solutions in the embodiments of the present application will be clearly and completely described below in conjunction with the accompanying drawings in the embodiments of the present application.

Obviously, the described embodiments are only part of embodiments of the present application, but not all the embodiments. Based on the embodiments in the present application, all other embodiments obtained by those skilled in the art without creative efforts fall within the scope of protection of the present application.

In practical applications, enterprises would limit the upper limit of the number of group members in order to reduce the number of unnecessary large groups, reduce noise, and reduce the risk of wide spread of sensitive information. For example, enterprise collaborative work software allows tenant administrators to configure a common group size for all members within the tenant. After configuration, the number of group members must not exceed this size when a member of the enterprise establishes a group. However, in some special application scenarios, the member may need to establish a group with more members than the above-mentioned size. Due to the above-mentioned size limitations, it is impossible to establish a group on demand.

Based on this, an embodiment of the present application provides a method for processing group information. When the first user needs to expand the upper limit of the number of the target group, he/she may transmit an expansion request through the client. After receiving the expansion request, based on a configuration by the second user, an expansion response is transmitted to the client of the first user. That is, the technical solution provided by the embodiment of the present application supports users in applying for expansion of the upper limit of the number of group members in the group autonomously, and then supports configuring supplementary rules for a single group, thus it will no longer be subjected to general size restriction, which improves the user experience.

In order to facilitate understanding of the technical solution provided by the embodiments of the present application, the following will be described in conjunction with the accompanying drawings.

Figure 1:
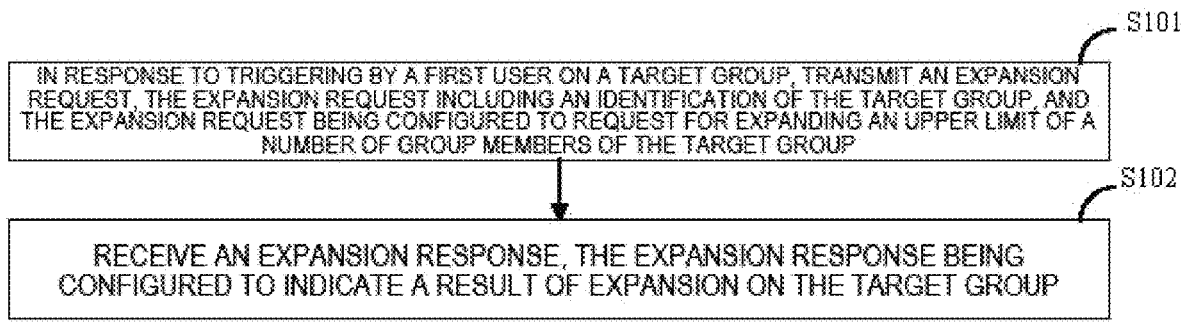
FIG. 1 is a flow chart of a method for processing group information provided by an embodiment of the present application.

Refer to FIG. 1, it is a flow chart of a method for processing group information provided by an embodiment of the present application. As shown in FIG. 1, this method can be executed by a device for processing group information. The g device for processing group information can be a server, an electronic device, or other devices, which is not limited here. Among them, the server may be a cloud server or a server cluster or other device with storage and computing functions. The electronic device may include a mobile phone, a tablet computer, a desktop computer, a notebook computer, a vehicle-mounted terminal, a wearable electronic device, an all-in-one machine, a smart home device or other device with communication functions, or the electronic device may be a device simulated by a virtual machine or simulator. As shown in FIG. 1, the method may include the following steps.

S101: in response to triggering by a first user on a target group, an expansion request is transmitted.

In this implementation, for an existing target group, the first user may apply for expanding the target group, and for a client where the target group is located, it transmits an expansion request based on the trigger operation of the first user. The expansion request includes an identification of the target group and it may also include a target number for expansion. The identification of the target group may be a link to the target group, that is, a uniform resource locator (URL) of the target group, and the target number is the upper limit of the number of people corresponding to the target group after requesting expansion.

Generally, for a group, it includes a large number of group members. In order to maintain the order within the group and keep the information healthy and positive, the group owner or group administrator needs to take the main responsibility. Therefore, when applying for expansion, a person with group management permission is required to initiate the application, that is, the first user must be a group owner or an administrator of the target group. The target group can be a conversation group, a topic group, a secret chat group, etc.

Optionally, there are several implementations for transmitting an expansion request in response to the triggering by the first user on the target group as follows. One is to transmit the expansion request to a management backend (backend server) based on the triggering by the first user on the target group, so that after receiving the expansion request, the management background notifies an administrator (second user) to perform corresponding configurations according to the expansion request. Another one is to transmit an expansion request to a client of a third user based on the triggering by the first user on the target group; and in response to the processing by third user on the expansion request, transmit a confirmation message to the management background. Among them, the third user is a person with expansion permission, such as an enterprise administrator or a person with decision-making authority in the enterprise. That is to say, the client of the first user firstly transmits an expansion request to a client of the third user. After the third user confirms through its own client, it may transmit confirmation message to the client of the first user, and then the client of the first user transmits the confirmation message to the management background, and the management background then configures the upper limit of the number of group members of the target group based on the confirmation message.

The first user transmitting the expansion request in response to the triggering by the first user on the target group may include the following scenarios:

In one scenario, the first user enters a group management page, and the group management page includes an application entrance for group member expansion, that is, the page includes an application component; and in response to triggering by the first user on the application component, an expansion request is transmitted. The application component is configured to apply for expanding the target group.

Figure 2A:
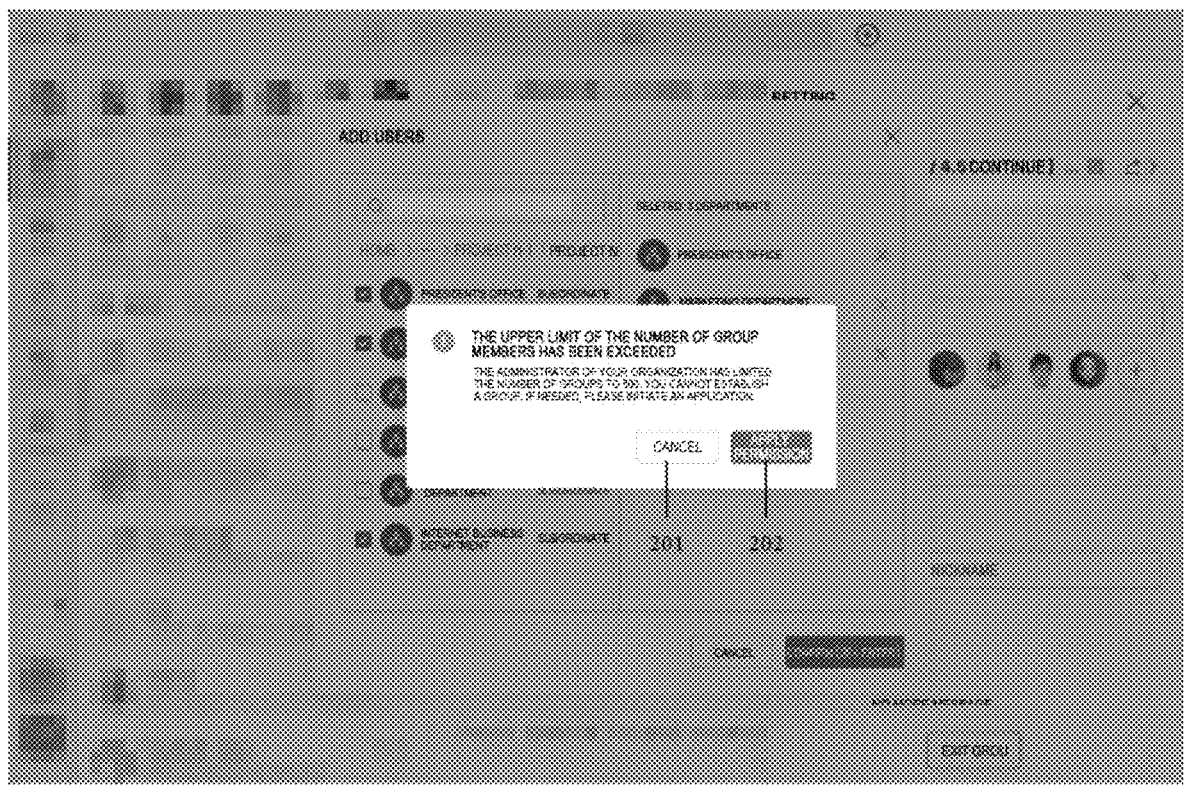
FIG. 2a is a schematic diagram of a blocking page provided by an embodiment of the present application.

In another scenario, in response to adding of a group member triggered by the first user on the target group and the number of group members of the target group reaching a predetermined upper limit, the expansion request is transmitted based on an application operation triggered by the first user. Specifically, when the number of group members of the target group reaches a predetermined upper limit, if the first user triggers the adding of the group member, in this case, a blocking page will be displayed to prompt the first user that the number of group members of the target group has reached the predetermined upper limit. At the same time, the blocking page may include an application component, and in response to triggering by the first user on the application component, the expansion request is transmitted. For example, as shown in FIG. 2a, the title of the blocking page is "The upper limit of the number of group members has been exceeded"; the description is "The administrator of your organization has limited the number of group members to 500 . . . "; and the cancellation component 201 and the application permission component 202 are shown as well.

Figure 2B:
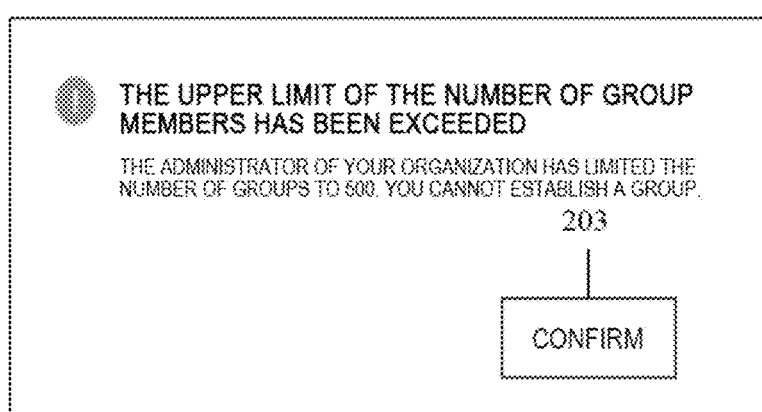
FIG. 2b is a schematic diagram of another blocking page provided by an embodiment of the present application.

It should be noted that the reason why the blocking page is displayed with the application component is that the management background enables a permission application interface. If the management background disables the permission application interface, the application component will not be displayed on the blocking page. As shown in FIG. 2b, FIG. 2b illustrates a blocking page, and the title is "The upper limit of the number of group members has been exceeded"; the description is: "The administrator of your organization has limited the number of group members to 500"; and a confirmation component 203 is shown as well.

Figure 2C:
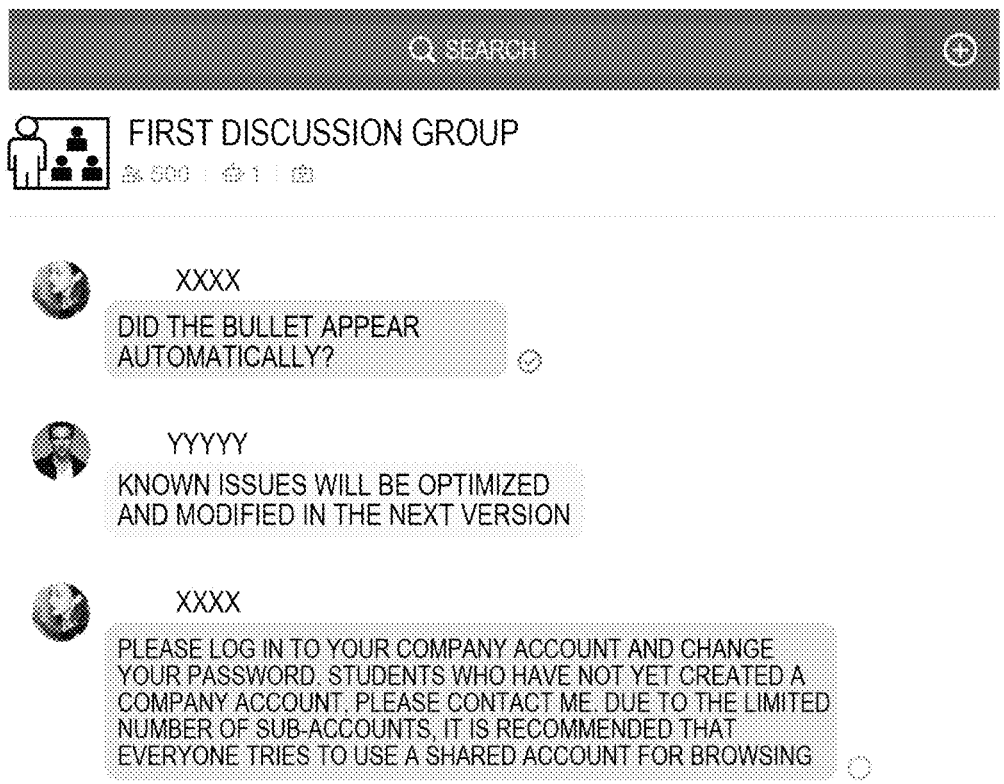
FIG. 2c is a schematic diagram of an application permission entrance provided by an embodiment of the present application.

In yet another scenario, when the client of the target group detects that the number of group members of the target group reaches the predetermined upper limit, the application component is displayed on the conversation page of the target group; in response to a trigger operation by the first user on the application component, the expansion request is transmitted. For example, as shown in FIG. 2c, the system prompts on the conversation page that the number of people in the group has reached the upper limit of the number of 500 set by the organization and a permission application component is shown as well. It should be noted that system messages are only visible to the group owners and administrators.

Figure 2D:
FIG. 2d is a schematic diagram of an application page provided by an embodiment of the present application.

Optionally, in response to the triggering by the first user on the application component, an application page will be displayed. The application page is configured to present content required to be filled in for requesting expansion and a confirmer; in response to the first user completing filing-in on the application page, the expansion request is transmitted. For example, as shown in FIG. 2d, it includes the title "Application for maximum number of group members", the name and avatar of the target group, and selection of the upper limit of the number of group members (for unauthenticated tenants, it supports configuration of 5/10/30/50/100/200/300; for authenticated tenants, it supports configuration of 5/10/30/50/100/200/300/500/1000/2000), application purpose (required), confirmation, confirmation rules, and a cancellation component and a confirmation component. If the first user clicks the cancellation component when adding group members to the target group, information of the selected members can be saved. When the first user clicks the confirmation component, an expansion request is transmitted to the management background. In this case, information of the selected members can be saved.

Optionally, after transmitting the expansion request, a notification message may be transmitted to the client of the first user, and the notification message is configured to inform the first user that the expansion request has been transmitted.

The predetermined upper limit mentioned in the above description is an upper limit of a number of group members preconfigured by the second user based on the management background. The second user is an administrator corresponding to the management background, who has a permission to configure the upper limit of the number of group members. Specifically, the predetermined upper limit may be a first maximum number of people set by the second user for a group owner of the target group based on the management background, or the predetermined upper limit may be a second maximum number of people set by the second user for a group based on the management background. When the first maximum number of people and the second maximum number of people exist at the same time, the predetermined upper limit is the first maximum number of people. That is, the group member size set individually for the user has a higher priority than a general size set for the group.

In this embodiment, the second user may configure the general group size for all members based on the management background. After configuration, the number of group members must not exceed this size when an enterprise member establishes a group. Alternatively, the second user may configure a size of a group visible to a single member based on the management background. After configuration, all groups established by this member may have a size higher or lower than the general group size. For example, the general group size configured by the second user in the management background is 300 people; that is, when everyone in the enterprise establishes a group, the number of group members must not exceed 300. At the same time, the second user configures a supplementary rule corresponding to user 1 at the management background, and the group size is configured as 500, then when user 1 establishes a group, the number of group members of the established group shall not exceed 500; and the second user configures a supplementary rule corresponding to user 2 at the management background, and the group size is configured as 200, when user 2 establishes a group, the number of group members of the established group shall not exceed 200.

Since the target group can be a conversation group, a topic group, etc., the first user may set different maximum number of people for different types of groups. That is, different types of groups correspond to different second maximum numbers of people. Among them, the specific implementation of the second user configuring the group size based on the management background will be explained in subsequent embodiments.

S102: an expansion response is received, the expansion response being configured to indicate a result of expansion on the target group.

In this embodiment, when the second user configures the target group based on the management background, the management background will transmit an expansion response to the client where the target group is located, so as to notify the first user of the expansion result through the expansion response. Among them, the specific implementation of the management background transmitting the expansion response to the target group will be explained in subsequent embodiments.

Optionally, since the information of the selected members can be saved when applying for expansion in the scenario of adding members, the selected user is added as a member of the target group in response to the expansion response indicating that the target group has been successfully expanded and adding of a member triggered by the first user on the target group.

It can be seen that when the first user needs to expand the upper limit of the number of the target group, he/she can transmit an expansion request through the client. After receiving the expansion request, an expansion response is transmitted to the client of the first user based on the configuration of the second user. That is, the technical solutions provided by embodiments in this application support users autonomously applying for expanding the upper limit of the number of people of the group, and thus supports configuring supplementary rules for a single group, so that it is no longer limited by the general scale, which improves the user experience.

The above embodiments describe that the first user may apply to the management background for expanding the upper limit of the number of group members of the target group through its corresponding client.

After receiving the expansion request, the management background will perform subsequent processes based on the expansion request and the configuration of the second user, which will be explained below with reference to the accompanying drawings.

Figure 3:
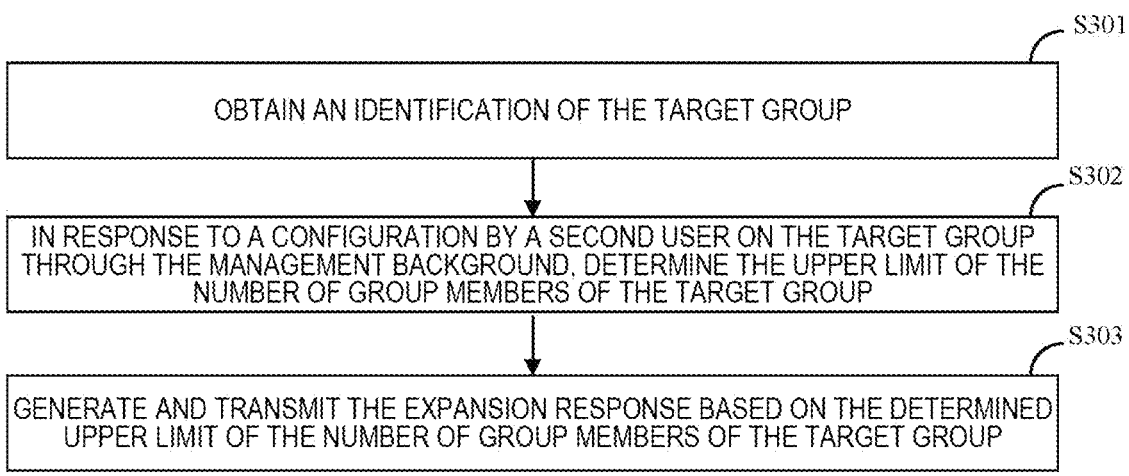
FIG. 3 is a flow chart of another method for processing group information provided by an embodiment of the present application.

Refer to FIG. 3, FIG. 3 is a flow chart of another method for processing group information provided by an embodiment of the present application. As shown in FIG. 3, this method can be executed by a device for processing group information. The g device for processing group information can be a server, an electronic device, or other devices, which is not limited here. Among them, the server may be a cloud server or a server cluster or other device with storage and computing functions. The electronic device may include a mobile phone, a tablet computer, a desktop computer, a notebook computer, a vehicle-mounted terminal, a wearable electronic device, an all-in-one machine, a smart home device or other device with communication functions, or the electronic device may be a device simulated by a virtual machine or simulator. As shown in FIG. 3, the method may include the following steps.

S301: an identification of the target group is obtained.

In this embodiment, in order to expand the capacity of target group, the management background first obtains the identification of the target group. The identification of the target group may be the URL of the target group.

Obtaining the identification of the target group can be implemented in the following ways: one is that the second user inputs the identification of the target group into the management background. Another is to receive an expansion request transmitted by the first user through the client, where the expansion request includes the identification of the target group, and the identification of the target group is obtained by parsing the expansion request.

S302: in response to a configuration by a second user on the target group through the management background, the upper limit of the number of group members of the target group is determined.

In this embodiment, the second user will configure the upper limit of the number of group members of the target group through the management background, and determine the upper limit of the number of people of the target group in response to the configuration by the second user.

Specifically, in response to a configuration triggered by the second user on the group size management page of the management background, a first supplementary rule for the target group is determined. Among them, the first supplementary rule includes the identification of the target group and the upper limit of the number of people in the target group.

Optionally, in response to the configuration triggered by the second user on a group size management page of the management background, a second supplementary rule for the first user is determined. The second supplementary rule includes the identification of the first user and the upper limit of the number of people corresponding to a group established by the first user.

Figure 4A:
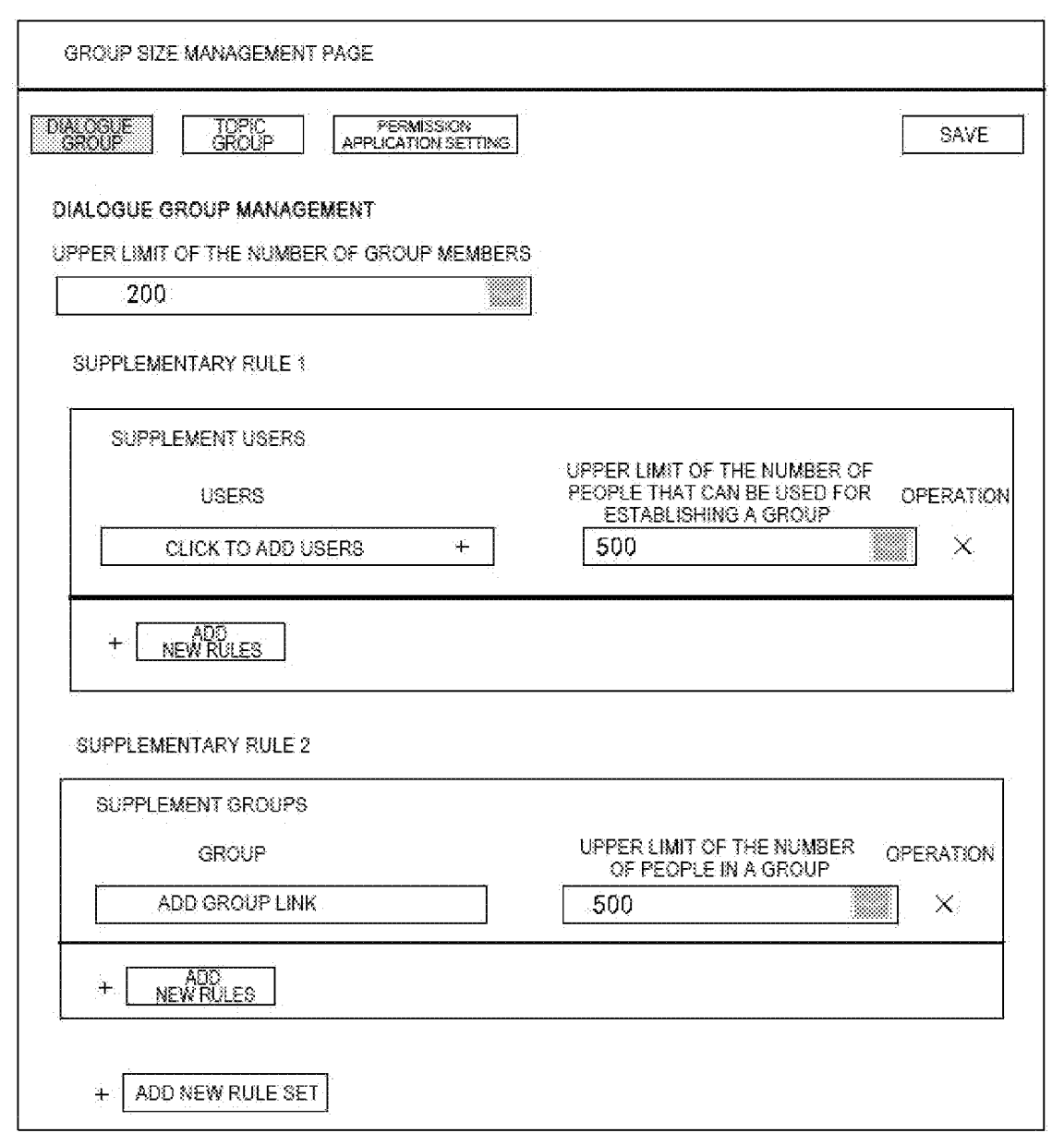
Figure 4B:
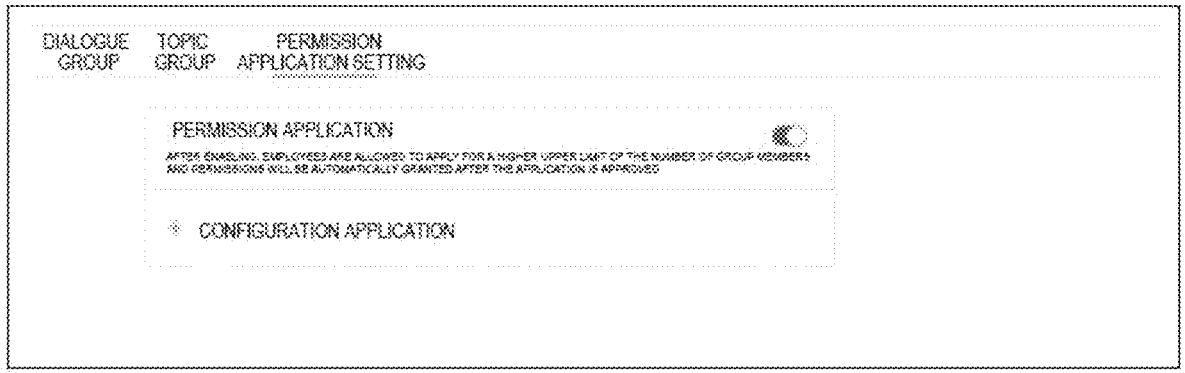
FIG. 4b is a schematic diagram of a permission confirmation setting page provided by an embodiment of the present application.

For example, as shown in FIG. 4a, the group size management page includes a conversation group component and a topic group component, that is, the second user may configure the group size for different types of groups. FIG. 4a takes a dialogue group as an example. The second user may set a general group size, for example, 200. Furthermore, supplementary rules can be added according to needs. A supplementary rule 1 is to set the group size in terms of users. The second user may add the users to be configured and the upper limit of the number of people of the group established by the user. A supplementary rule 2 is to set the group size for a single group. The second user may add a group link to be configured and the upper limit of the number of people corresponding to the group. In response to the second user clicking the save button, the configured information becomes effective. The second user may add new rules through a new rule setting component.

It should be noted that when setting a general maximum number of people, the upper limit of the number of group member in terms of users, or the upper limit of the number of a target group, the upper limit of the number of group members for authenticated or unauthenticated tenant group members shall be complied with. For example, for unauthenticated tenants, it supports configuration of 5/10/30/50/100/200/300, and for authenticated tenants, it supports configuration of 5/10/30/50/100/200/300/500/1000/2000. In addition, enterprise department groups, all-tenant groups, and very large groups are not subject to the above limitation, but they are still subject to the upper limit of the number for authenticate tenants.

S303: the expansion response is generated and transmitted based on the determined upper limit of the number of group members of the target group, so as to indicate the result of expansion of the target group through the expansion response.

After the second user configures the upper limit of the number of group members of the target group through the management background, the management background generates an expansion response based on the configuration of the second user, and transmits the expansion response to the client of the first user.

Among them, the group size management page also includes a permission application setting component. The second user enters a permission application setting page through the permission application setting component. The permission application setting page may include a permission application interface and a configuration application component. The second user configures a state of the permission application interface on the permission application setting page and sets information related to a permission application by the configuration application component. For example, in the permission application setting page shown in FIG. 4b, the second user may set to enable the permission application interface or disable the permission application interface. When the second user enables the permission application interface, the first user may transmit the expansion request to the management background through the client.

Figure 4C:
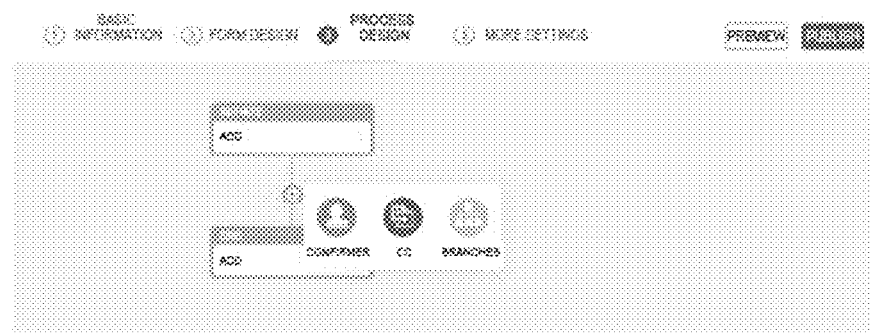
FIG. 4c is a schematic diagram of a confirmation process configuration page provided by an embodiment of the present application.

When the second user clicks to the configuration application component, he/she can enter a permission application configuration page, as shown in FIG. 4c. In this configuration page, the second user may configure information related to the permission application. Among them, information related to the permission application may include application page design, process design, etc. Among them, the application page design includes basic information, form design, etc. The basic information may refer to the necessary information displayed on the application page, and the form design may refer to the content that the first user needs to fill in when applying for permission, etc.

It can be seen that in this embodiment, the second user may set the upper limit of the number of people in a single group based on the management background, so as to configure different maximum numbers of people according to the needs of different groups to meet the needs of users.

Based on the above method embodiments, an embodiment of the present application provides an apparatus for processing group information, which will be described below with reference to the accompanying drawings.

Figure 5:
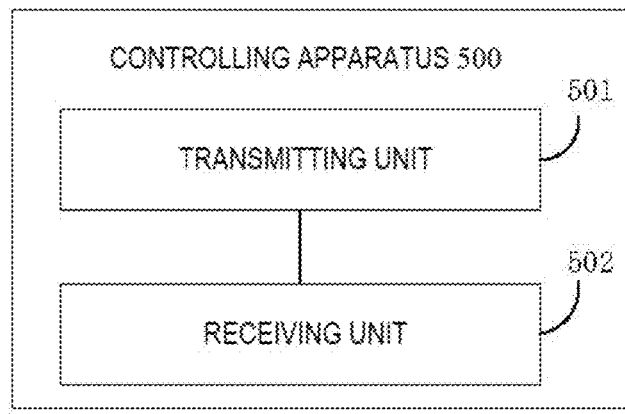
FIG. 5 is a schematic structural diagram of an apparatus for processing group information provided by an embodiment of the present application.

Referring to FIG. 5, it is a structural diagram of an apparatus for processing group information provided by an embodiment of the present application. As shown in FIG. 5, the apparatus 500 may include a transmitting unit 501 and a receiving unit 502.

The transmitting unit 501 is transmit an expansion request in response to triggering by a first user on a target group, the expansion request comprising an identification of the target group, and the expansion request being configured to request for expanding an upper limit of a number of group members of the target group.

The receiving unit 502 is configured to receive an expansion response, the expansion response being configured to indicate a result of expansion on the target group.

In a specific implementation, the transmitting unit 501 is specifically configured to, in response to adding of a group member triggered by the first user on the target group and the number of group members of the target group reaching a predetermined upper limit, transmit the expansion request based on an application operation triggered by the first user.

In a specific implementation, the transmitting unit 501 is specifically configured to, in response to the adding of the group member triggered by the first user on the target group and the number of group members of the target group reaching the predetermined upper limit, display a blocking page, the blocking page comprising an application component; and in response to triggering by the first user on the application component, transmit the expansion request.

In a specific implementation, the transmitting unit 501 is specifically configured to, in response to the number of group members of the target group reaching a predetermined upper limit, display an application component on a conversation page of the target group; and in response to triggering by the first user on the application component, transmit the expansion request.

In a specific implementation, the transmitting unit 501 is specifically configured to, in response to the triggering by the first user on the application component, display an application page, the application page being configured to present content required to be filled in for requesting expansion and a confirmer; and in response to the first user completing filing-in on the application page, transmit the expansion request.

In a specific implementation, the predetermined upper limit is preconfigured by a second user based on a management background, and the predetermined upper limit is a first maximum number of people set by the second user for a group owner of the target group based on the management background, or the predetermined number of people is a second maximum number of people set by the second user for a group based on the management background.

In a specific implementation, different types of groups correspond to different second maximum numbers of people.

In a specific implementation, the transmitting unit 501 is specifically configured to, in response to the triggering by the first user on the target group, transmit the expansion request to the management background; or, in response to the triggering by the first user on the target group, transmit the expansion request to a client of a third user, the third user being a person with expansion permission; and in response to processing by the third user on the expansion request, transmit a confirmation message to the management background.

In a specific implementation, the expansion request also includes a target number, and the target number is maximum number of people after requesting expansion.

In a specific implementation, the apparatus further includes: an adding unit;

The adding unit is specifically configured to add a selected user as a member of the target group in response to the expansion response indicating that the target group has been successfully expanded and adding of a member triggered by the first user on the target group.

In a specific implementation manner, the first user is the group owner or administrator of the target group.

In a specific implementation, the obtaining process of the expansion response includes: obtaining the identification of the target group from the expansion request; in response to a configuration by a second user on the target group through the management background, determining the upper limit of the number of group members of the target group; and generating and transmitting the expansion response based on the determined upper limit of the number of group members of the target group.

In a specific implementation, in response to the configuration by the second user on the target group through the management background, determining the upper limit of the number of group members of the target group includes: in response to the configuration triggered by the second user on a group size management page of the management background, determining a first supplementary rule for the target group, the first supplementary rule comprising the identification of the target group and the upper limit of the number of group members corresponding to the target group.

In a specific implementation, the method further includes: in response to the configuration triggered by the second user on a group size management page of the management background, determining a second supplementary rule for the first user, the second supplementary rule comprising the identification of the first user and an upper limit of a number of group members corresponding to a group established by the first user.

In a specific implementation manner, the method further includes: in response to a configuration by the second user on a permission application setting page in a group size management page of the management background, determining a state of a permission application interface and information related to a permission application.

In a specific implementation manner, the information related to the permission application includes at least one of application page design and process design.

It should be noted that the implementation of each unit in this embodiment can be found in the relevant descriptions in the above method embodiments, and this embodiment will not be repeated here.

Figure 6:
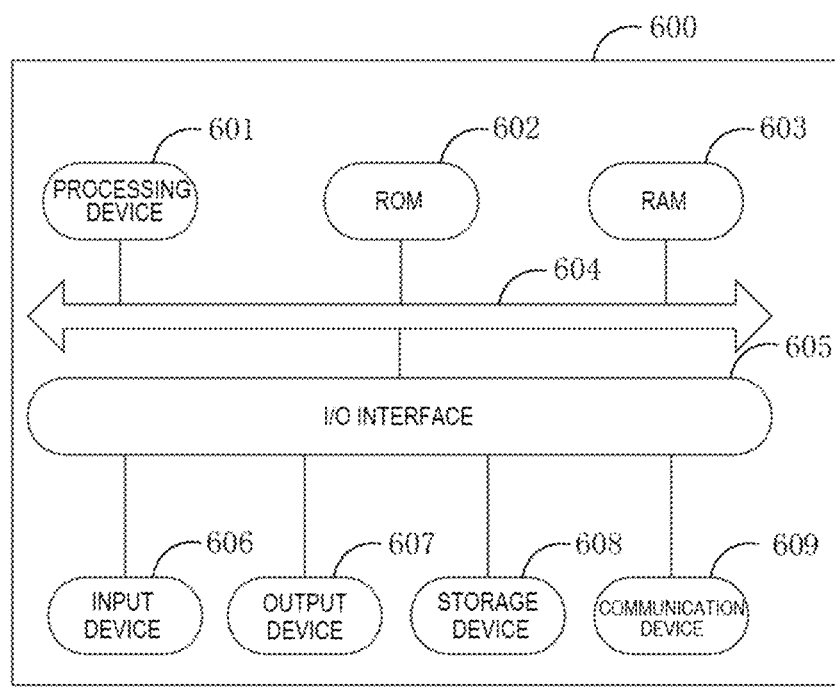
FIG. 6 is a schematic structural diagram of an electronic device provided by an embodiment of the present application.

Referring to FIG. 6, it is a structural schematic diagram of an electronic device suitable for implementing the embodiment of the present application. The terminal device 600 in the embodiment of the present application may include but is not limited to mobile terminals such as mobile phones, laptops, digital broadcast receivers, PDAs (Personal Digital Assistants), PADs (tablet computers), PMPs (portable multimedia players), car-mounted terminals (such as car navigation terminals), etc. and fixed terminals such as digital TVs (television), desktop computers, etc. The electronic device shown in FIG. 6 is only an example and should not bring any limitation on the functionality and scope of use of the embodiment of the present application.

As shown in FIG. 6, the electronic device 600 may include a processing device (such as a central processing unit, graphics processing unit, etc.) 601, which may perform various appropriate actions and processes based on programs stored in Read-Only Memory (ROM) 602 or loaded from storage device 608 into Random Access Memory (RAM) 603. In the RAM 603, various programs and data necessary for the operation of the electronic device 600 are also stored. The processing device 601, ROM 602, and RAM 603 are connected to each other through a bus 604. An Input/Output I/O interface 605 is also connected to the bus 604.

Typically, the following devices can be connected to I/O interface 605: input devices 606 including, for example, touch screens, touchpads, keyboards, mice, cameras, microphones, accelerometers, gyroscopes, etc.; output devices 607 including liquid crystal displays (LCDs), speakers, vibrators, etc.; storage devices 508 including magnetic tapes, hard disks, etc.; and a communication device 609. The communication device 609 may allow the electronic device 600 to communicate with other devices wirelessly or wirelessly to exchange data. Although FIG. 6 shows an electronic device 600 with a plurality of devices, it shall be understood that it is not required to implement or have all of the devices shown. More or fewer devices can be implemented or provided instead.

In particular, according to embodiments of the present application, the process described above with reference to the flowchart can be implemented as a computer software program. For example, an embodiment of the present application includes a computer program product that includes a computer program carried on a non-transitory computer-readable medium, where the computer program includes program code for performing the method shown in the flowchart. In such an embodiment, the computer program can be downloaded and installed from a network through the communication device 609, or installed from the storage device 608, or installed from the ROM 602. When the computer program is executed by the processing device 601, the above functions defined in the method of the embodiment of the present application are performed.

The electronic device provided in this embodiment of the present application and the method for processing group information provided in the above embodiments belongs to the invention idea. Technical details that are not described in detail in this embodiment can be found in the above embodiments, and this embodiment has the same beneficial effect as the above embodiments.

An embodiment of the present application provides a computer storage medium on which a computer program is stored, when being executed by a processor, the program implements the method for processing group information provided in the above embodiments.

It should be noted that the computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Specific examples of computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present application, a computer-readable storage medium may be any tangible medium containing or storing a program that can be used by an instruction execution system, apparatus, or device, or can be used in combination with an instruction execution system, apparatus, or device. In the present application, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatuses, or devices. The program code contained on the computer-readable medium may be transmitted using any suitable medium, including but not limited to: wires, optical cables, RF (radio frequency), etc., or any suitable combination thereof.

In some embodiments, clients and servers can communicate using any currently known or future developed network protocol such as HTTP (Hyper Text Transfer Protocol), and can be interconnected with any form or medium of digital data communication (such as communication networks). Examples of communication networks include local area networks ("LANs"), wide area networks ("WANs"), inter-networks (such as the Internet), and end-to-end networks (such as ad hoc end-to-end networks), as well as any currently known or future developed networks.

The computer-readable medium can be included in the electronic device, or it can exist alone without being assembled into the electronic device.

The above-mentioned computer-readable medium carries one or more programs, and when the above-mentioned one or more programs are executed by the electronic device, the electronic device executes the above method for processing group information.

Computer program codes for performing the operations of the present application may be written in one or more programming languages or a combination thereof, including but not limited to Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including local area network (LAN) or wide area network (WAN)—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present application. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present application may be implemented by means of software or hardware, and the name of the unit does not constitute a limitation on the unit itself in a certain case, for example, a first obtaining unit may also be described as "a unit for obtaining at least two internet protocol addresses".

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium.

A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

It should be noted that various embodiments are described in the description in a progressive manner. Each embodiment is described focusing on its differences from other embodiments. The same and similar parts between the embodiments can be cross-referenced with each other. For systems or devices disclosed in the embodiments, the descriptions thereof are relatively simple as they correspond to the methods disclosed in the embodiments. For relevant details, please refer to the description of the section for method.

It should be understood that in this disclosure, "at least one" refers to one or more, and "a plurality of" refers to two or more. "And/or" is used to describe an association between associated objects, indicating that there can be three relationships therebetween. For example, "A and/or B" may indicate: only A exists, only B exists, and A and B exist simultaneously. where A and B can be singular or plural. The symbol "/" generally indicates that the related objects are in an "or" relationship. "At least one of the following (item)" or similar expressions thereof refers to any combination of the items, including any combination of a single item or a plurality of items. For example, at least one (item) of a, b or c may refer: a, b, c, "a and b", "a and c", "b and c", or "a and b and c", and a, b, c can be singular or plural.

It should also be noted that in this article, relational terms such as first and second are only used to distinguish one entity or operation from another entity or operation, which do not necessarily imply any actual relationship or sequence therebetween. Furthermore, the terms "comprises", "includes" and any other variations thereof are intended to cover a non-exclusive inclusion such that a process, method, article, or apparatus including a series of elements includes not only those elements, but also other elements not expressly listed, or elements inherent to the process, method, article or device. Without further limitation, elements defined by the statement "comprises a . . . " does not exclude the presence of additional identical elements in a process, method, article, or apparatus that includes the stated element.

The steps of the methods or algorithms described in conjunction with the embodiments disclosed herein may be implemented directly in hardware, in software modules executed by a processor, or in a combination of the two. Software modules may be located in random access memory (RAM), memory, read only memory (ROM), electrically programmable ROM, electrically erasable programmable ROM, registers, hard disks, removable disks, CD-ROMs, or any other form of storage media commonly known in the art.

The above description of the embodiments of the present application enables those skilled in the art to implement or use the present application. Various modifications to these embodiments will be apparent to those skilled in the art, and the general principles defined herein may be implemented in other embodiments without departing from the spirit or scope of the disclosure. Therefore, the present application is not to be limited to the embodiments shown herein but shall comply with the widest scope consistent with the principles and novel features disclosed herein.

We claim:

1. A method for processing group information, comprising:
in response to adding of a group member triggered by a first user on a target group and a number of group members of the target group reaching a predetermined upper limit, displaying a blocking page, the blocking page comprising an application component;
in response to triggering by the first user on the application component, transmitting an expansion request based on an application operation triggered by the first user, the expansion request comprising an identification of the target group, and the expansion request being configured to request for expanding an upper limit of a number of group members of the target group; and
receiving an expansion response, the expansion response being configured to indicate a result of expansion of the target group.

2. The method of claim 1, further comprising:
in response to the number of group members of the target group reaching a predetermined upper limit, displaying an application component on a conversation page of the target group; and
in response to triggering by the first user on the application component, transmitting the expansion request.

3. The method of claim 1, wherein in response to the triggering by the first user on the application component, transmitting the expansion request comprises:
in response to the triggering by the first user on the application component, displaying an application page, the application page being configured to present content required to be filled in for requesting expansion and a confirmer; and
in response to the first user completing filing-in on the application page, transmitting the expansion request.

4. The method of claim 1, wherein the predetermined upper limit is preconfigured by a second user based on a management background, and the predetermined upper limit is a first upper limit of a number of people set by the second user for a group owner of the target group based on the management background, or the predetermined number of people is a second upper limit of a number of people set by the second user for a group based on the management background.

5. The method of claim 1, wherein in response to the triggering by the first user on the application component, transmitting the expansion request comprises:
in response to the triggering by the first user on the application component, transmitting the expansion request to a management background; or
in response to the triggering by the first user on the application component, transmitting the expansion request to a client of a third user, the third user being a person with expansion permission; and in response to processing by the third user on the expansion request, transmitting a confirmation message to the management background.

6. The method of claim 1, wherein the expansion request further comprises a target number, and the target number is an upper limit of a number of people after requesting expansion.

7. The method of claim 1, further comprising:
in response to the expansion response indicating that the target group has been successfully expanded and adding of a member triggered by the first user on the target group, adding a selected user as a member of the target group.

8. The method of claim 1, wherein an obtaining process of the expansion response comprises:
obtaining the identification of the target group from the expansion request;
in response to a configuration by a second user on the target group through a management background, determining the upper limit of the number of group members of the target group; and
generating and transmitting the expansion response based on the determined upper limit of the number of group members of the target group.

9. The method of claim 8, wherein in response to the configuration by the second user on the target group through the management background, determining the upper limit of the number of group members of the target group comprises:
in response to the configuration triggered by the second user on a group size management page of the management background, determining a first supplementary rule for the target group, the first supplementary rule comprising the identification of the target group and the upper limit of the number of group members corresponding to the target group.

10. The method of claim 8, further comprising:
in response to the configuration triggered by the second user on a group size management page of the management background, determining a second supplementary rule for the first user, the second supplementary rule comprising the identification of the first user and an upper limit of a number of group members corresponding to a group established by the first user.

11. The method of claim 8, further comprising:
in response to a configuration by the second user on a permission application setting page in a group size management page of the management background, determining a state of a permission application interface and information related to a permission application.

12. An electronic device, comprising:
a processor and a memory;
the memory being configured to store instructions or computer programs; and
the processor being configured to execute the instructions or computer programs in the memory, to cause the electronic device to perform acts comprising:
in response to adding of a group member triggered by a first user on a target group and a number of group members of the target group reaching a predetermined upper limit, displaying a blocking page, the blocking page comprising an application component;
in response to triggering by the first user on the application component, transmitting an expansion request, the expansion request comprising an identification of the target group, and the expansion request being configured to request for expanding an upper limit of a number of group members of the target group; and
receiving an expansion response, the expansion response being configured to indicate a result of expansion of the target group.

13. The electronic device of claim 12, wherein the acts further comprises:
in response to the number of group members of the target group reaching a predetermined upper limit, displaying an application component on a conversation page of the target group; and
in response to triggering by the first user on the application component, transmitting the expansion request.

14. The electronic device of claim 12, wherein in response to the triggering by the first user on the application component, transmitting the expansion request comprises:

in response to the triggering by the first user on the application component, displaying an application page, the application page being configured to present content required to be filled in for requesting expansion and a confirmer; and in response to the first user completing filing-in on the application page, transmitting the expansion request.

15. The electronic device of claim 12 wherein the predetermined upper limit is preconfigured by a second user based on a management background, and the predetermined upper limit is a first upper limit of a number of people set by the second user for a group owner of the target group based on the management background, or the predetermined number of people is a second upper limit of a number of people set by the second user for a group based on the management background.

16. A non-transitory computer-readable storage medium storing instructions therein, the instructions, upon running on a device, causing the device to perform acts comprising:

in response to adding of a group member triggered by a first user on a target group and a number of group members of the target group reaching a predetermined upper limit, displaying a blocking page, the blocking page comprising an application component;

in response to triggering by the first user on a target group the application component, transmitting an expansion request, the expansion request comprising an identification of the target group, and the expansion request being configured to request for expanding an upper limit of a number of group members of the target group; and receiving an expansion response, the expansion response being configured to indicate a result of expansion of the target group.

* * * * *